US012028240B2

(12) United States Patent
Lin et al.

(10) Patent No.: US 12,028,240 B2
(45) Date of Patent: Jul. 2, 2024

(54) METHOD, ELECTRONIC DEVICE, AND COMPUTER PROGRAM PRODUCT FOR CROSS-REGIONAL DATA SEARCHING

(71) Applicant: Dell Products L.P., Round Rock, TX (US)

(72) Inventors: Zhenzhen Lin, Shanghai (CN); Si Chen, Shanghai (CN); Anzhou Hou, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 27 days.

(21) Appl. No.: 17/855,884

(22) Filed: Jul. 1, 2022

(65) Prior Publication Data
US 2023/0403227 A1    Dec. 14, 2023

(30) Foreign Application Priority Data

Jun. 10, 2022 (CN) .......................... 202210658339.5

(51) Int. Cl.
*H04L 45/12* (2022.01)
*H04L 45/122* (2022.01)
*H04L 45/745* (2022.01)

(52) U.S. Cl.
CPC .......... *H04L 45/126* (2013.01); *H04L 45/122* (2013.01); *H04L 45/745* (2013.01)

(58) Field of Classification Search
CPC .... H04L 45/126; H04L 45/122; H04L 45/745
See application file for complete search history.

(56) References Cited

U.S. PATENT DOCUMENTS

| 7,818,402 | B1 | 10/2010 | Zhang |
| 11,005,703 | B1 | 5/2021 | Wu et al. |
| 11,416,465 | B1 | 8/2022 | Anwar et al. |
| 11,537,619 | B1 | 12/2022 | Goyal |
| 11,544,229 | B1 | 1/2023 | Seideman et al. |

(Continued)

FOREIGN PATENT DOCUMENTS

CN    101510897 A    8/2009

OTHER PUBLICATIONS

P. Maymounkov et al., "Kademlia: A Peer-to-Peer Information System Based on the XOR Metric," First International Workshop on Peer-to-Peer Systems (IPTPS), Mar. 7-8, 2002, 6 pages.

(Continued)

*Primary Examiner* — William G Trost, IV
*Assistant Examiner* — Monishwar Mohan
(74) *Attorney, Agent, or Firm* — Ryan, Mason & Lewis, LLP

(57) ABSTRACT

Embodiments of the present disclosure relate to a method, an electronic device, and a computer program product for cross-regional data searching. The method includes acquiring a data identifier of target data in response to receiving a searching request for the target data at a first node. The method includes determining, based on the data identifier, a second node storing metadata of the target data, wherein both the first node and the second node are located in a first region, and the metadata includes the data identifier. The method further includes determining, based on the metadata, a third node storing the target data, wherein the third node is located in a second region different from the first region.

21 Claims, 5 Drawing Sheets

(56) References Cited

U.S. PATENT DOCUMENTS

| | | |
|---|---|---|
| 11,882,181 B2 | 1/2024 | Chen et al. |
| 2005/0198286 A1 | 9/2005 | Xu et al. |
| 2010/0115133 A1* | 5/2010 | Joshi .................. H04L 67/1014 |
| | | 709/245 |
| 2010/0169280 A1* | 7/2010 | Shi ..................... H04L 67/1046 |
| | | 709/224 |
| 2012/0221692 A1 | 8/2012 | Steiner et al. |
| 2013/0151683 A1 | 6/2013 | Jain et al. |
| 2016/0197831 A1 | 7/2016 | De Foy et al. |
| 2016/0301751 A1* | 10/2016 | Peelen .................... H04L 67/06 |
| 2017/0272100 A1 | 9/2017 | Yanovsky et al. |
| 2019/0163372 A1 | 5/2019 | Sridharan |
| 2020/0012619 A1 | 1/2020 | Gupta et al. |
| 2020/0036789 A1 | 1/2020 | Mehta et al. |
| 2020/0301883 A1* | 9/2020 | Kamiya ................. G06F 16/278 |
| 2021/0126970 A1* | 4/2021 | Zhang ................. G06F 16/2255 |
| 2021/0168207 A1* | 6/2021 | Lin ..................... H04L 67/1023 |
| 2021/0233319 A1* | 7/2021 | Cardonha ............. G09G 5/003 |
| 2022/0182243 A1 | 6/2022 | Wang et al. |
| 2022/0245093 A1 | 8/2022 | Batsakis et al. |
| 2022/0292068 A1 | 9/2022 | Lin et al. |
| 2023/0239350 A1 | 7/2023 | Chen et al. |

OTHER PUBLICATIONS

U.S. Appl. No. 17/673,459 filed in the name of Si Chen et al. filed Feb. 16, 2022, and entitled "Method, Device, and Computer Program Product for Data Storage."

* cited by examiner

METHOD, ELECTRONIC DEVICE, AND COMPUTER PROGRAM PRODUCT FOR CROSS-REGIONAL DATA SEARCHING

RELATED APPLICATION(S)

The present application claims priority to Chinese Patent Application No. 202210658339.5, filed Jun. 10, 2022, and entitled "Method, Electronic Device, and Computer Program Product for Cross-Regional Data Searching," which is incorporated by reference herein in its entirety.

FIELD

Embodiments of the present disclosure relate to the field of data processing, and in particular, to a method, an electronic device, and a computer program product for cross-regional data searching.

BACKGROUND

In an edge architecture, nodes with dynamic natures are widely distributed on a large scale. A decentralized system can adapt to the edge architecture. In the decentralized system, all nodes can automatically join the network at any time without a central control agent, and the decentralized system can provide users with low-latency data services.

However, nodes are mobile. When searching for data or acquiring data across regions, a node may need to go through multiple hops to route to other regions to obtain metadata so as to locate the data by performing a lookup in a routing table. If the network latency between regions is high, it will take a long time to obtain data, showing a degradation in performance of acquiring data.

SUMMARY

A method, an electronic device, and a computer program product for cross-regional data searching are provided in embodiments of the present disclosure.

According to a first aspect of the present disclosure, a method for cross-regional data searching is provided. The method includes acquiring a data identifier of target data in response to receiving a searching request for the target data at a first node. The method includes determining, based on the data identifier, a second node storing metadata of the target data, wherein both the first node and the second node are located in a first region, and the metadata includes the data identifier. The method further includes determining, based on the metadata, a third node storing the target data, wherein the third node is located in a second region different from the first region.

According to a second aspect of the present disclosure, an electronic device is provided. The electronic device includes at least one processor; and a memory coupled to the at least one processor and having instructions stored thereon, wherein the instructions, when executed by the at least one processor, cause the device to execute actions including: acquiring a data identifier of target data in response to receiving a searching request for the target data at a first node; determining, based on the data identifier, a second node storing metadata of the target data, wherein both the first node and the second node are located in a first region, and the metadata includes the data identifier; and determining, based on the metadata, a third node storing the target data, wherein the third node is located in a second region different from the first region.

According to a third aspect of the present disclosure, a computer program product is provided. The computer program product is tangibly stored on a non-transitory computer-readable medium and includes machine-executable instructions, and the machine-executable instructions, when executed by a machine, cause the machine to perform steps of the method in the first aspect of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure.

In the figures, identical or corresponding numerals represent identical or corresponding parts.

DETAILED DESCRIPTION

Illustrative embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As mentioned above, nodes in an edge architecture are mobile. When searching for data or acquiring data across regions, a node may need to go through multiple hops to route to other regions to obtain metadata so as to locate the data by performing a lookup in a routing table. If the network latency between regions is high, it will take a long time to obtain data, showing a degradation in performance of acquiring data.

In order to solve the above and other potential problems, an embodiment of the present disclosure provides a method for cross-regional data searching. In this method, a first node acquires a data identifier of target data in response to receiving a searching request for the target data. The first node determines, based on the data identifier, a second node storing metadata of the target data, wherein both the first node and the second node are located in a first region, and the metadata includes the data identifier. The first node further determines, based on the metadata, a third node storing the target data, wherein the third node is located in a second region different from the first region. Through the method, for a demand for cross-regional data searching, the first node can search routing information in this region, thereby accelerating the processing speed of cross-regional data searching, reducing the latency, and improving the flexibility and performance of data acquisition.

Figure 1:
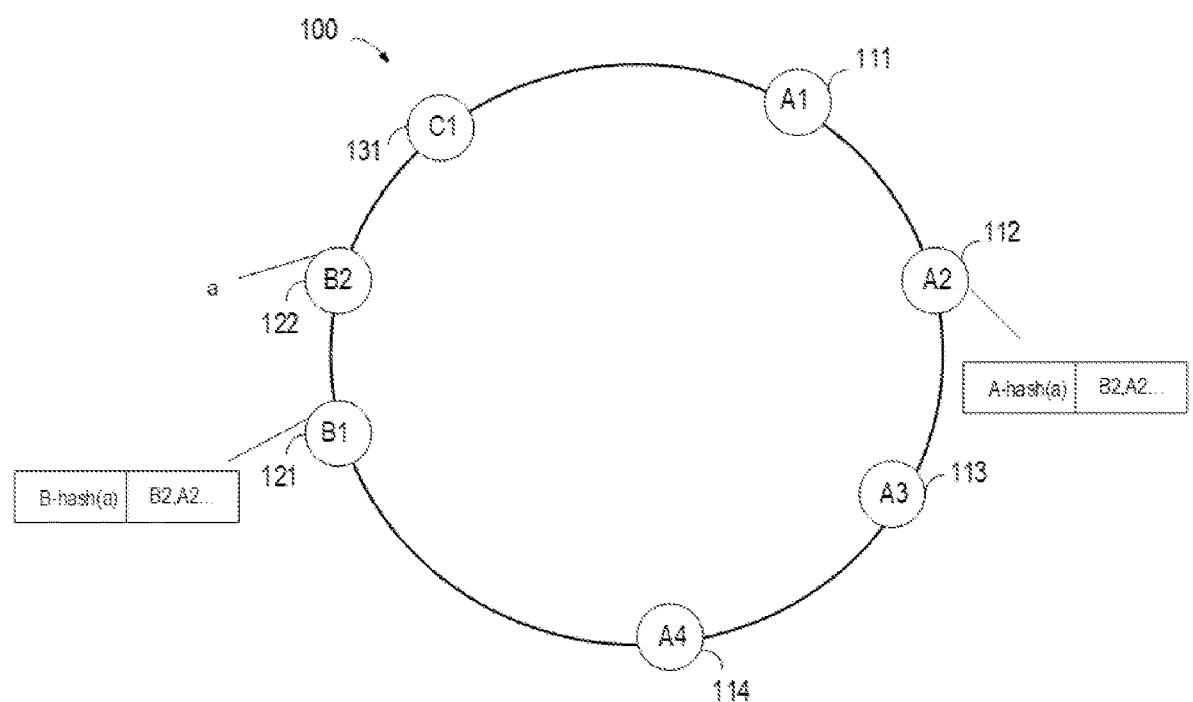
FIG. 1 is a schematic diagram of an example environment in which a device and/or a method according to an embodiment of the present disclosure can be implemented.

Embodiments of the present disclosure will be further described in detail with reference to the accompanying drawings below. FIG. 1 is a schematic diagram of example environment in which embodiments of the present disclosure can be implemented.

As shown in FIG. 1, a distributed hash table (DHT) ring 100 constructed according to a DHT is used for illustrating an example environment in which embodiments of the present disclosure can be implemented. A plurality of nodes A1 111, A2 112, A3 113, A4 114, B1 121, B2 122, and C1 131 are distributed in DHT ring 100 as shown in FIG. 1. The nodes may be any computing device with computing resources or storage device with storage resources. For example, the nodes may have common capabilities such as real-time data analysis, local data storage, and real-time network connectivity. The nodes can typically include various types of terminal devices.

Examples of the terminal devices include, but are not limited to: desktop computers, laptop computers, smart phones, wearable devices, security cameras, smart manufacturing devices, smart household devices, Internet of Things (IoT) devices, smart cars, and the like. It should be understood that although only seven nodes are shown in FIG. 1, it is only an example, rather than a specific limitation to the present disclosure. In DHT ring 100, any number and any type of nodes may be included.

Various nodes may be placed in corresponding locations of DHT ring 100 based on, for example, geographic location, and classified according to regions. Taking DHT ring 100 in FIG. 1 as an example, three regions are shown in DHT ring 100: a first region where nodes A1 111, A2 112, A3 113, and A4 114 are located; a second region where nodes B1 121 and B2 122 are located; and a third region where C1 131 is located. Here, a region may refer to a region obtained by division based on geographic location, such as a subdistrict and a city.

Each node in DHT ring 100 may store data and/or metadata of the data. For example, one node stores data and another node stores metadata corresponding to the data. Metadata is used for describing attributes of data, and the metadata may include a data identifier which includes: a hash identifier obtained by hashing the data with a hash algorithm; and a geographic information identifier representing a region where a node storing the metadata is located. Taking the nodes in the second region as an example, node B2 122 in the second region stores data a, and node B1 121 stores metadata Mb of data a. Moreover, metadata Mb may include data identifier I corresponding to data a and routing information R of data a, and data identifier I includes hash identifier hash (a) obtained by hashing data a and geographic location identifier B representing the region where the node storing the metadata is located (for example, indicating the second region). Routing information R may include routing information of data a. In addition, the metadata may also include the size of the data, the source of the data, and the like, which are not limited in the present disclosure.

A method according to some embodiments of the present disclosure can realize efficient cross-regional data searching. In one embodiment, the hash identifier and the geographic location identifier can be decoupled. By decoupling the data identifier, the geographic location identifier in the data identifier can be replaced with an updated geographic location identifier, updated metadata is further generated, and then the metadata including the updated data identifier is further stored in the region represented by the updated geographic location identifier. Thus, cross-regional storage of the metadata can be realized.

Taking FIG. 1 as an example, when the first region is a target region (for example, when a node in the first region intends to search for data a), first node A1 111 may update geographic location identifier B in metadata Mb stored in node B1 121 in the second region to first geographic location identifier A of the region where first node A1 111 is located, thereby obtaining metadata Ma, and storing metadata Ma in second node A2 112. In the above manner, when a node (for example, first node A1 111) in the target region (for example, first region A) needs to search for data, metadata can be easily acquired from this region, and data a stored in another region (e.g., the second region) can be found and acquired according to the metadata. As a result, the processing speed of cross-regional data searching can be accelerated, which reduces the latency and improves the flexibility and performance of data acquisition.

A block diagram of an example environment in which embodiments of the present disclosure can be implemented has been described above with reference to FIG. 1. A flow chart of method 200 for cross-regional data searching according to an embodiment of the present disclosure is described below with reference to FIG. 2. Method 200 can be performed at any node in FIG. 1 and any suitable computing device. The following description will be made with first node A1 111 in first region A as the execution subject. Those skilled in the art should understand that method 200 may be performed at any node in FIG. 1.

At block 202, first node A1 111 acquires a data identifier of target data (e.g., data a) in response to receiving a searching request for the target data at first node A1 111.

In a DHT-based system, a corresponding DHT routing table may be stored inside each node, and the routing table records routing information of related data. When first node A1 111 receives a searching request for target data (e.g., a), first node A1 111 may search its stored routing table to obtain data identifier I of the target data (e.g., a). For example, data identifier I may include hash identifier $I_H$ (e.g., hash (a)) obtained by hashing the target data (e.g., a) and geographic location identifier $I_L$ (e.g., A) representing the first region, where hash identifier $I_H$ and geographic location identifier $I_L$ can be decoupled. In one embodiment, geographic location identifier $I_L$ represents a region in which metadata of the target data is stored.

At block 204, first node A1 111 determines a second node storing metadata of the target data based on the data identifier, where both the first node and the second node are located in the first region, and the metadata includes the data identifier.

In one embodiment, after acquiring data identifier I, first node A1 111 may determine that the metadata is stored in the first region based on geographic location identifier $I_L$ (e.g., A) in the data identifier. First node A1 111 determines a node storing the target data based on the data identifier. In one embodiment, first node A1 111 may calculate a distance between data identifier I and an identifier of each node in the region (e.g., calculate an XOR distance), and determine a node corresponding to the shortest distance among the calculated distances as the node storing the target data. Taking FIG. 1 as an example, first node A1 111 may determine that a node with the shortest distance from data identifier I is second node A2 112, so that it may be determined that the metadata of the target data is stored in second node A2 112, as shown in FIG. 1.

In block 206, the first node determines, based on the metadata, a third node storing the target data, where the third node is located in a second region different from the first region.

In one embodiment, first node A1 111 may determine, based on the metadata acquired from second node A2 112, that target data a is stored in second node B2 122 in the second region different from the first region. Therefore, the searching for target data a may be implemented, and the target data may be further acquired from node B2 122.

Furthermore, in one embodiment, for metadata stored in a node, e.g., metadata Ma stored in second node A2 112, when metadata Ma is not searched for within a predetermined time interval (e.g., 24 hours), the metadata will be deleted from second node A2 112. In this way, metadata may be automatically generated and removed from a node, thus achieving update of metadata storage and being convenient for a node to search for metadata in the current region more quickly and efficiently.

Figure 2:
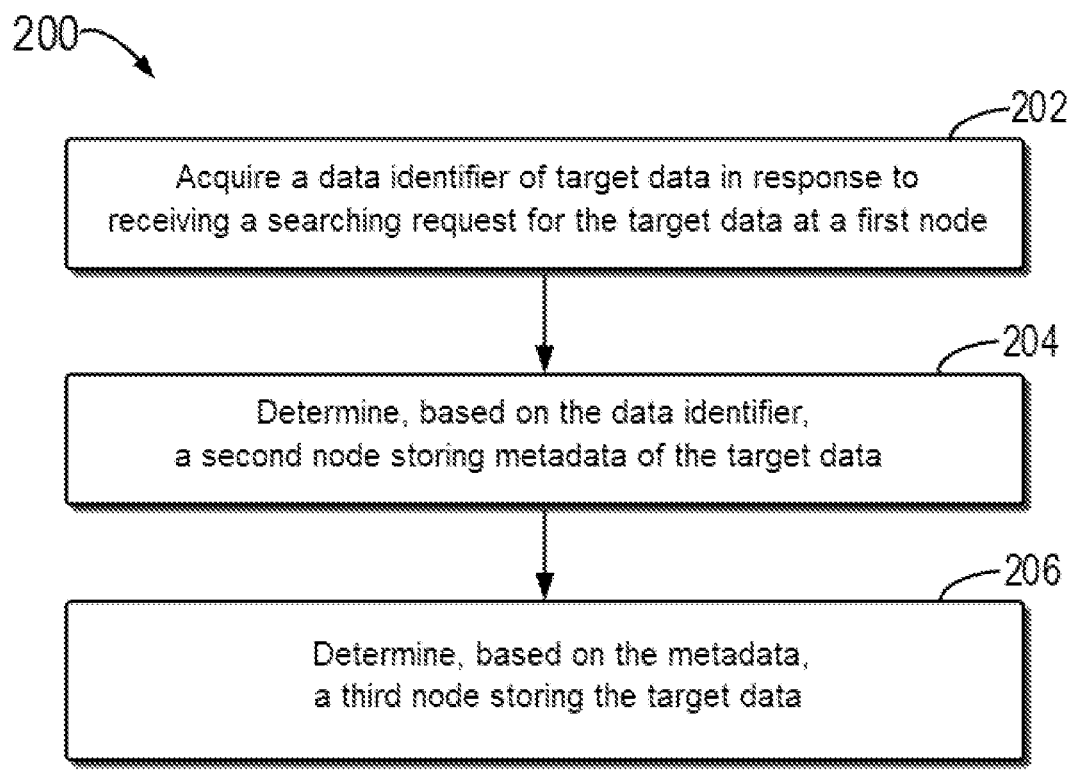
FIG. 2 is a flow chart of a method for cross-regional data searching according to an embodiment of the present disclosure.

Method 200 in FIG. 2 describes an implementation method for cross-regional data searching, which, for example, implements fast searching for and acquisition of target data a stored in the second region from the first region. By decoupling the geographic location identifier and the hash identifier in the data identifier, updating the geographic location identifier in the metadata with the geographic location identifier indicating a target searching region, and storing the updated metadata in the target searching region, in a case of searching for target data across regions, metadata can be found in this region, thereby quickly searching for and acquiring data stored across regions. Through this method, the processing speed of cross-regional data searching can be accelerated, which reduces the latency and improves the flexibility and performance of data acquisition.

In one embodiment, the metadata stored in the target searching region is obtained based on update of initial metadata, the initial metadata is stored at a node in a region different from the first region (e.g., at a fourth node in the second region), an initial data identifier in the initial metadata includes a hash identifier and a second geographic information identifier representing the second region, and the second geographic information identifier and the hash identifier may be decoupled.

In one embodiment, the initial metadata may be initial metadata of the target data, the initial metadata includes initial data identifier $I_{int}$, and initial data identifier $I_{int}$ includes hash identifier $I_H$ and initial geographic information identifier $I_{Lint}$ representing a region where the target data is located, and hash identifier $I_H$ and initial geographic information identifier $I_{Lint}$ representing the region where the target data is located may be decoupled.

Taking FIG. 1 as an example for description, it is understandable that metadata Mb may correspond to the initial metadata of target data a, and metadata Ma is obtained based on update of initial metadata Mb. In initial metadata Mb, initial data identifier $I_{int}$ includes hash identifier Ix hash (a) and initial geographic information identifier $I_{Lint}$ B representing a region where the node storing initial metadata Mb is located. Moreover, hash identifier $I_H$ hash (a) and initial geographic information identifier $I_{Lint}$ B may be decoupled. Metadata Ma is obtained based on update of initial metadata Mb. As shown in FIG. 1, metadata Ma is obtained by updating initial geographic information identifier $I_{Lint}$ B to that representing the target searching region (e.g., the first region). Specific updating operation details will be described in detail hereinafter.

There are various methods of updating a geographic location information identifier. In one embodiment, a node in the target searching region (for example, first node A1 111 in first region A that intends to search for data or another node) can implement the update of the target data and further obtain the updated metadata. Hereinafter, the specific operation of updating the metadata by first node A1 111 will be described in detail with reference to FIG. 3.

Figure 3:
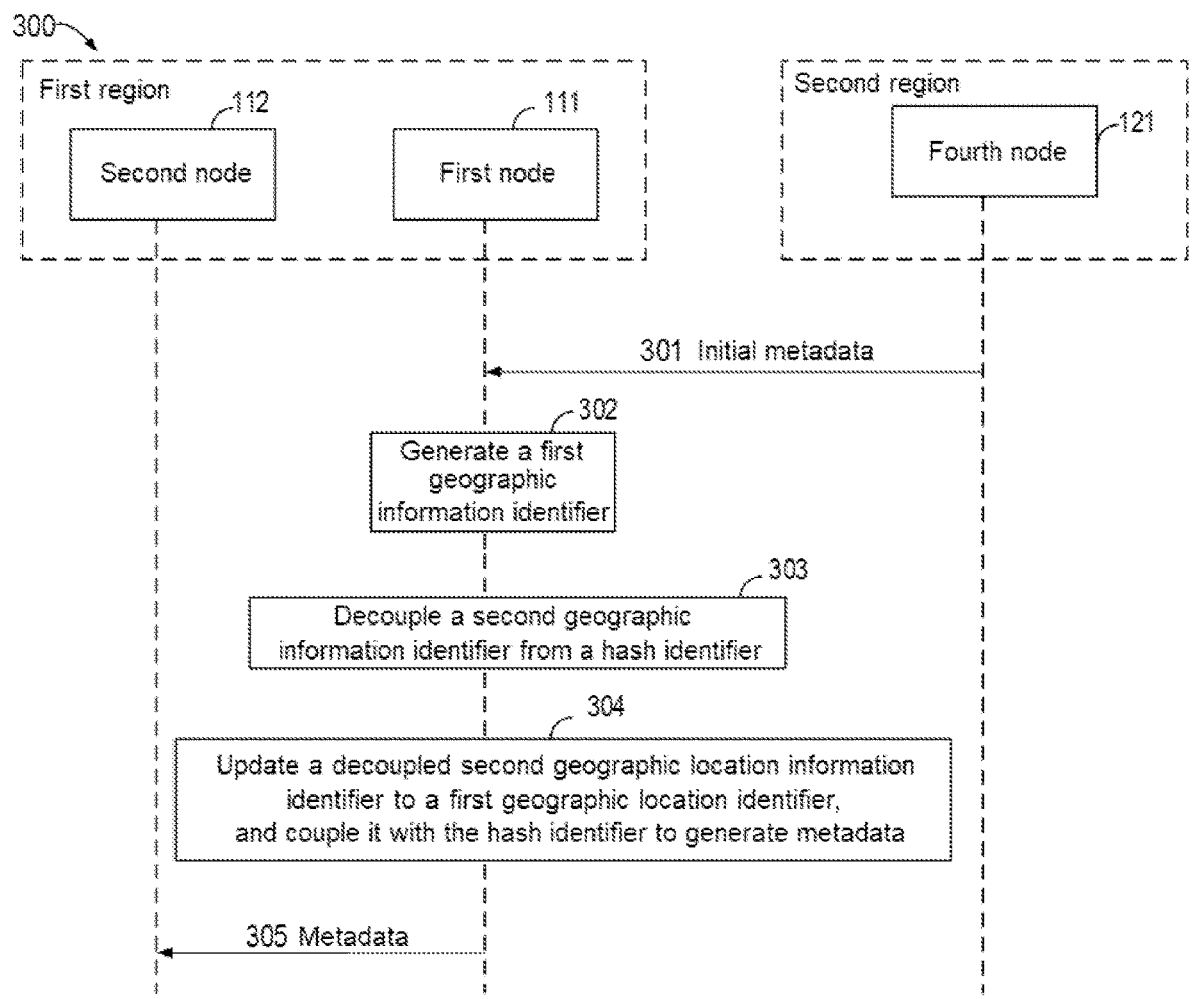
FIG. 3 is a schematic diagram of an example process of updating metadata by a first node according to an embodiment of the present disclosure.

Flow chart 300 of operations performed by a node in a target region (e.g., first node A1 111) to update metadata is shown in FIG. 3. Those skilled in the art should understand that the flow chart 300 in FIG. 3 is only illustrative, and flow chart 300 may be performed at any node in a target searching region.

As shown in FIG. 3, flow chart 300 is described in combination with first node A1 111 and second node A2 112 in first region A and fourth node B1 121 in the second region (fourth node B1 121 stores initial metadata Mb).

At 301, first node A1 111 in the first region acquires initial metadata Mb from fourth node B1 121. In one embodiment, as shown in FIG. 1, initial metadata Mb includes initial data identifier $I_{int}$, and initial data identifier $I_{int}$ includes hash identifier $I_H$ hash (a) and initial geographic information identifier $I_{Lint}$ B, where initial geographic information identifier $I_{Lint}$ B indicates a region where the node storing initial metadata Mb is located (e.g., the second region).

At 302, first node A1 111 generates, in response to determining that the target data is to be searched for by a node in the first region, a first geographic information identifier, the first geographic information identifier indicating a target region for searching for the data.

In one embodiment, in addition to searching for the target data, first node A1 111 may also predict whether other nodes (e.g., node A2 112 and node A3 113) in the region also need to search for the target data and other data stored in second region B. When first node A1 111 determines that the target data is to be searched for by the node of the first region, first node A1 111 may determine the first region where it is located as the target region, and generate first geographic information identifier $I_L$ e.g., A, indicating the target region.

At 303, first node A1 111 may decouple the second geographic information identifier from the hash identifier. In one embodiment, first node A1 111 in the initial metadata may decouple a second geographic information identifier (i.e., initial geographic information identifier Lint B) in the received initial metadata from hash identifier $I_H$ hash (a). For example, first node A1 111 may remove the second geographic information identifier (i.e., initial geographic information identifier $I_{Lint}$ B) in the received initial metadata from initial data identifier $I_{int}$ in initial metadata Mb, so as to decouple it from hash identifier $I_H$ hash (a).

At 304, first node A1 111 updates the decoupled second geographic information identifier to the first geographic information identifier, and couples it with the hash identifier to obtain metadata including the data identifier.

In one embodiment, first node A1 111 updates the decoupled second geographic information identifier (i.e., initial geographic information identifier $I_{Lint}$ B) with generated first geographic information identifier $I_L$ (e.g., A) indicating the target region, and couples updated geographic information identifier $I_L$ with hash identifier $I_H$ hash (a) (i.e., combines updated geographic information identifier $I_L$ with hash identifier $I_H$ hash (a)), thereby generating updated data identifier I. Based on updated data identifier I, updated metadata Ma may be acquired.

In one embodiment, geographic information identifier $I_L$ in the metadata may be located before hash identifier $I_H$ as a prefix of hash identifier $I_H$ Moreover, geographic information identifier $I_{Lint}$ B in the initial metadata may be used as a prefix of hash identifier $I_H$. At 305, first node A1 111 stores the metadata in the second node A2 112 based on data identifier I.

In one embodiment, first node A1 111 determines the second node storing the metadata based on data identifier I in the metadata and an identifier of each node in the first region.

First node A1 111 may determine a distance between data identifier I and the identifier of each node in the first region. Based on the determined distances, first node A1 111 may determine the shortest distance among these distances, and determine a node corresponding to the shortest distance in the first region as the second node. In one embodiment, first node A1 111 may determine a distance between data identifier I and the identifier of each node in the first region based on an XOR distance between data identifier I and the identifier of each node in the first region. The present disclosure does not limit the specific distance determining method.

After determining that the identifier of second node A2 112 has the shortest distance from data identifier I in the metadata, first node A1 111 stores metadata Ma in second node A2 112, as shown in FIG. 1. It should be understood that the above examples are only examples, and a node storing metadata in the first region may be determined according to actual specific conditions.

In addition, in one embodiment, the updating of the metadata may also be implemented by the node storing the initial metadata (for example, fourth node B1 121 in the second region in FIG. 1) to obtain the updated metadata, and the node may send the updated metadata to an appropriate node in the target region, e.g., the node in the first region with the shortest distance between its identifier and the data identifier of the metadata (e.g., node A2 112 in FIG. 1).

Specifically, in one embodiment, the fourth node (e.g., fourth node B1 121 in the second region in FIG. 1) may detect the frequency at which initial metadata Mb stored therein is accessed by a node from a certain region, for example, the number of accesses by one or a plurality of nodes from the region within a predetermined time. If the fourth node determines that the number of accesses exceeds an access threshold, it may determine that the region is the target region for searching for the target data. For example, the fourth node detects that the number of accesses to metadata Mb by a node from the first region exceeds the access threshold within the predetermined time, then it determines that the first region is the target region for searching for target data a, and may store the updated metadata in the target region.

As indicated previously, in some embodiments, initial metadata Mb includes initial data identifier $I_{int}$, initial data identifier $I_{int}$ includes hash identifier $I_H$ hash (a) and initial geographic information identifier $I_{Lint}$ B, where initial geographic information identifier $I_{Lint}$ B indicates the region where the node storing the initial metadata is stored (for example, the second region). In addition, the initial metadata may also include other information, such as the size of data corresponding to the identifier, the source of the data, and other information.

In one embodiment, the fourth node generates first geographic information identifier $I_L$ (e.g., A) representing the first region in response to determining that the first region is the target region for searching for the target data.

Afterwards, the fourth node generates data identifier I based on hash identifier $I_H$ and first geographic information identifier $I_L$ and generates updated metadata based on data identifier I. In one embodiment, taking data a as an example, the fourth node may acquire hash identifier $I_H$ Hash (a) that is obtained after hashing data a, wherein hash identifier $I_H$ Hash (a) is the same as hash identifier $I_H$ Hash (a) in initial metadata Mb. The fourth node further adds generated first geographic information identifier $I_L$ (for example, identifier A representing the target region as the first region) before hash identifier $I_H$ Hash (a), and uses it as a prefix of hash identifier $I_H$ Hash (a), thereby generating updated data identifier I. The fourth node combines updated data identifier I with the part of the initial metadata other than initial data identifier $I_{int}$, thereby generating updated metadata. In addition, in another embodiment, the fourth node may also copy the initial metadata, decouple hash identifier $I_H$ Hash (a) in the copied initial metadata from second geographic information identifier Lint B, replace decoupled second geographic information identifier $I_{Lint}$ B with generated first geographic information identifier $I_L$ (for example, geographic information identifier A representing the target region as the first region), and couple first geographic information identifier $I_L$ after the replacement with hash identifier $I_H$ Hash (a), thereby obtaining the updated metadata.

After generating the updated metadata, the fourth node sends the updated metadata to an appropriate node in the target region to store the updated metadata. Similarly, the fourth node may determine a distance between data identifier I and the identifier of each node in the target region. Based on the determined distances, the fourth node may determine the shortest distance among these distances, and determine a node in the target region corresponding to the shortest distance as the node storing the metadata, e.g., second node A2 112. In one embodiment, the fourth node may determine the distance between data identifier I and the identifier of each node in the target region based on the XOR distance between data identifier I and the identifier of each node in the target region. The present disclosure does not limit the specific distance determining method.

In addition, in one embodiment, as described above, data identifier I of the target data according to an embodiment of the present disclosure includes hash identifier $I_H$ (for example, hash (a)) and geographic location identifier $I_L$ (for example, A) representing the first region, where hash identifier $I_H$ and geographic location identifier $I_L$ may be decoupled. Based on this decoupling mechanism of hash identifier and geographic location identifier, a node may process data blocks in the case of decoupling the geographic location identifier from the hash identifier, thus avoiding data redundancy caused by different geographic location identifiers of the same data block.

Figure 4:
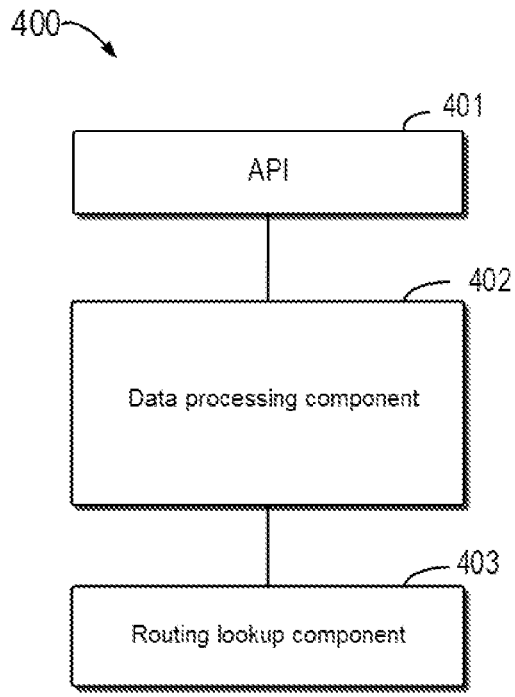
FIG. 4 is a schematic block diagram illustrating an example of processing data in a node according to an embodiment of the present disclosure.
Figure 5:
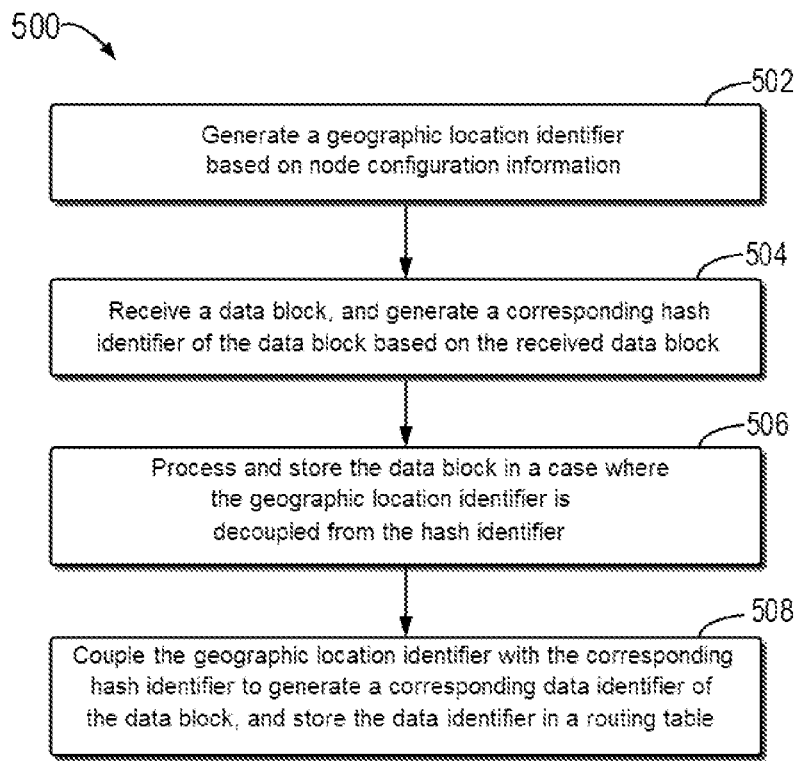
FIG. 5 is a flow chart of an example method for processing data by a node according to an embodiment of the present disclosure.

Hereinafter, an operation process of processing data by a node based on the mechanism that the geographic location identifier and the hash identifier can be decoupled will be described with reference to FIG. 4 and FIG. 5. FIG. 4 is schematic block diagram 400 illustrating an example of processing data in a node according to an embodiment of the present disclosure. FIG. 5 is a flow chart of an example method 500 of processing data by a node. The node corresponding to schematic block diagram 400 may be any node in the system, and method 500 in FIG. 5 may be performed at any node in the system.

As shown in FIG. 4, block diagram 400 for processing data in a node includes application programming interface (API) component 401, data processing component 402, and routing lookup component (e.g., DHT routing lookup component) 403. Hereinafter, first node A1 111 in the first region will be taken as an example for description, and those skilled in the art should understand that this is only an example, and the description for first node A1 111 may be applicable to any node.

In one embodiment, after receiving and processing a data block, first node A1 111 may provide a user with a data identifier including a hash identifier and a geographic location identifier through API 401, and the geographic location identifier may be used as a prefix of the hash identifier.

When first node A1 111 receives the uploaded data, data processing component 402 processes the received data. For example, data processing component 402 may construct a data block based on the received data, and perform hash processing on the data block to obtain hash identifier $I_H$. Data processing component 402 may manage and store the data block. In one embodiment, the data block may be stored to be separate from data processing component 402, which is not limited by the present disclosure.

In one embodiment, data processing component 402 may further generate a geographic location identifier based on node configuration information, where the geographic location identifier may identify a region where the first node is located. Data processing component 402 processes the data block in the case where the geographic location identifier is decoupled from the hash identifier. The data block is processed in the case where the geographic location identifier is decoupled from the hash identifier, which avoids data redundancy caused by different geographic location identifiers of the same data block.

Routing lookup component 403 stores routing information of various nodes. In one embodiment, a component from an upper layer of routing lookup component 403 (e.g., data processing component 402) may send the data identifier including the geographic location identifier and the hash identifier to routing lookup component 403 for subsequent routing lookup. In a process of sending the data identifier to routing lookup component 403, the upper-layer component may couple the decoupled geographic location identifier with the hash identifier, for example, add the geographic location identifier before the hash identifier as a prefix of the hash identifier, and send it to routing lookup component 403. In addition, in one embodiment, the upper-layer component may also transmit the geographic location identifier as a parameter to routing lookup component 403 in response to a function called by routing lookup component 403, so as to store the geographic location identifier and the hash identifier in the routing table. Moreover, the geographic location identifier may be used as the prefix of the hash identifier. Furthermore, in another embodiment, the component that generates the hash identifier may be reconfigured to generate an overall hash identifier and geographic location identifier (i.e., data identifier), and the hash identifier and the geographic location identifier may be decoupled, where the geographic location identifier may be used as the prefix of the hash identifier.

Hereinafter, a procedure of processing data by a node (e.g., the first node) will be described with reference to FIG. 5. It should be understood by those skilled in the art that method 500 in FIG. 5 may be performed at any node in the system.

At block 502, the first node generates a first geographic location identifier based on node configuration information. The first geographic location identifier indicates a region where the first node is located.

At block 504, the first node may receive a data block and generate a corresponding hash identifier of the data block based on the received data block. In one embodiment, the first node may receive a data block sent from another node, and generate a corresponding hash identifier according to the received data block. In one embodiment, the first node may receive data uploaded from a user, divide the uploaded data into blocks to generate data blocks, and generate corresponding hash identifiers according to the generated data blocks. The present disclosure does not limit the source of the data block received by the first node.

At block 506, the first node processes and stores the data block in a case where the first geographic location identifier is decoupled from the corresponding hash identifier. The data block is processed in the case where the geographic location identifier is decoupled from the hash identifier, which avoids data redundancy caused by different geographic location identifiers of the same data block.

At block 508, the first node may couple the first geographic location identifier with the corresponding hash identifier to generate a corresponding data identifier of the data block, and store the corresponding data identifier in a routing lookup table. Coupling the first geographic location identifier with the corresponding hash identifier may include combining the first geographic location identifier and the hash identifier, and the first geographic location identifier may be used as a prefix of the hash identifier. The combined first geographic location identifier and hash identifier may form the data identifier of the data block, the data identifier may be stored in the routing table, and the data identifier may be used for generating metadata together with other parts representing the attributes of the data.

The implementation of processing data by a node in a case that the geographic location identifier is decoupled from the hash identifier is described above with reference to FIG. 4 and FIG. 5, and the coupled geographic location identifier and hash identifier may be stored in the routing table for routing information lookup.

In addition, for a data searching request, when a node processes the searching request, it may look up whether target data is stored locally, and if so, the target data is sent to the first node locally; if not, the first geographic location identifier in the data identifier may be decoupled from the hash identifier, and in response to the decoupling, the searching request is processed and the processed searching request is sent to the node storing the metadata and obtained based on the data identifier information, so as to acquire the target data.

Data information is processed by decoupling the geographic location identifier from the hash identifier, which avoids data redundancy caused by different geographic location identifiers of the same data block.

Figure 6:
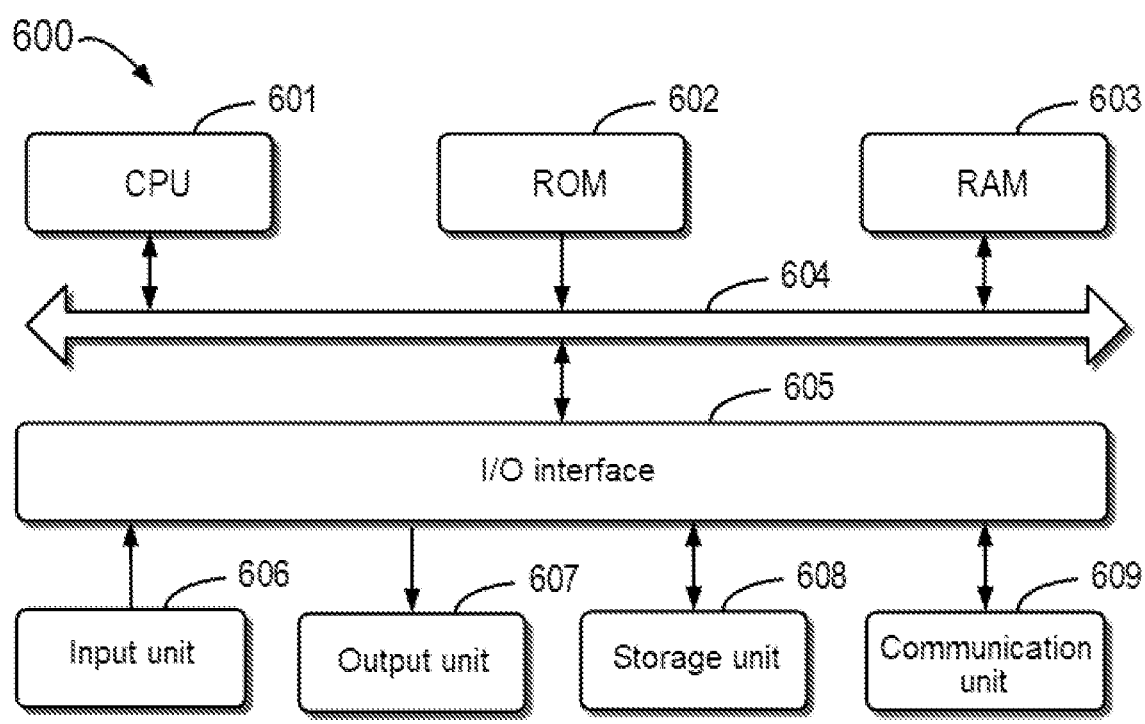
FIG. 6 is a schematic block diagram of an example device that is suitable for implementing an embodiment of the content of the present disclosure.

FIG. 6 is a schematic block diagram of example device 600 that can be used for implementing an embodiment of the present disclosure. One or more of the nodes in FIG. 1 may be implemented using device 600. As shown in the figure, device 600 includes central processing unit (CPU) 601 that may execute various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

Various processes and processing described above, e.g., methods 200 and 500, may be executed by CPU 601. For example, in some embodiments, methods 200 and 500 may be implemented as a computer software program that is tangibly included in a machine-readable medium such as storage unit 608. In some embodiments, part of or all the computer program may be loaded and/or installed onto device 600 via ROM 602 and/or communication unit 609. When the computer program is loaded to RAM 603 and executed by CPU 601, one or more actions of methods 200 and 500 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments or technical improvements to technologies on the market, so as to enable persons of ordinary skill in the art to understand the embodiments disclosed herein.

What is claimed is:

1. A method for cross-regional data searching, comprising:
   acquiring a data identifier of target data in response to receiving a searching request for the target data at a first node;
   determining, based on the data identifier, a second node storing metadata of the target data, wherein both the first node and the second node are located in a first region, and the metadata comprises the data identifier; and
   determining, based on the metadata, a third node storing the target data, wherein the third node is located in a second region different from the first region;
   wherein the data identifier comprises a first portion that is determined as a function of the target data and a second portion that is indicative of a geographic location of the target data, the second portion being configured for decoupling from the first portion so as to permit replacement in at least one of the nodes of a first instance of the second portion indicating location of the target data in one of the first and second regions with a second instance of the second portion, different than the first instance of the second portion, indicating location of the target data in another one of the first and second regions, without changing the first portion that is determined as the function of the target data; and
   wherein a given one of the nodes within a given one of the regions generates a geographic location identifier for that given node, and responsive to receiving a data block in the given node, the given node generates a first portion of a data identifier for the data block at least in part as a hash identifier for the data block, determines whether or not the geographic location identifier generated for the given node is decoupled from the hash identifier for the data block, and responsive to determining that the geographic location identifier generated for the given node is decoupled from the hash identifier for the data block, stores the data block within the given node, and couples the geographic location identifier generated for the given node to the hash identifier for the data block.

2. The method according to claim 1, wherein the data identifier comprises a hash identifier and a first geographic information identifier representing the first region, and the first geographic information identifier and the hash identifier are configured for decoupling from one another.

3. The method according to claim 2, wherein the metadata is obtained based on update of initial metadata, the initial metadata is stored at a fourth node in the second region, an initial data identifier in the initial metadata comprises the hash identifier and a second geographic information identifier representing the second region, and the second geographic information identifier and the hash identifier are configured for decoupling from one another.

4. The method according to claim 3, further comprising:
   acquiring the initial metadata from the fourth node;
   generating the first geographic information identifier in response to determining that the target data is to be searched for by a node in the first region;
   decoupling the second geographic information identifier from the hash identifier;
   updating the decoupled second geographic information identifier to the first geographic information identifier, and coupling the first geographic information identifier with the hash identifier to obtain the metadata comprising the data identifier; and
   storing the metadata in the second node based on the data identifier.

5. The method according to claim 4, wherein storing the metadata in the second node based on the data identifier comprises:
   determining a distance between the data identifier and an identifier of each node in the first region;
   determining the shortest distance in the distances; and
   determining a node corresponding to the shortest distance in the first region as the second node.

6. The method according to claim 3, wherein the metadata is generated by the fourth node and sent by the fourth node to the second node in the first region.

7. The method according to claim 6, wherein the metadata is generated by the fourth node by the following operations:
   generating, in response to determining that the first region is a target region for searching for the target data, the first geographic information identifier representing the first region;
   generating the data identifier based on the hash identifier and the first geographic information identifier; and
   generating the metadata based on the data identifier.

8. The method according to claim 2, further comprising:
decoupling a first geographic location identifier in the data identifier from the hash identifier; and
processing the searching request in response to the decoupling to acquire the target data.

9. The method according to claim 2, further comprising:
generating a first geographic location identifier based on node configuration information;
receiving a data block, and generating a corresponding hash identifier of the data block based on the data block;
processing and storing the data block in a case where the first geographic location identifier is decoupled from the corresponding hash identifier; and
coupling the first geographic location identifier with the corresponding hash identifier to generate a corresponding data identifier of the data block, and storing the corresponding data identifier in a routing lookup table.

10. The method according to claim 1, wherein the metadata is deleted from the second node when the metadata stored in the second node is not searched for within a predetermined time interval.

11. The method according to claim 1, wherein the first and second portions comprise respective portions of the same data identifier, with the first portion determined as a function of the target data and the second portion indicative of the geographic location of the target data being arranged in respective fields of that same data identifier, and the fields being stored in association with one another in an entry of a routing table of a given one of the nodes.

12. An electronic device, comprising:
at least one processor; and
a memory coupled to the at least one processor and having instructions stored therein, wherein the instructions, when executed by the at least one processor, cause the electronic device to perform actions comprising:
acquiring a data identifier of target data in response to receiving a searching request for the target data at a first node;
determining, based on the data identifier, a second node storing metadata of the target data, wherein both the first node and the second node are located in a first region, and the metadata comprises the data identifier; and
determining, based on the metadata, a third node storing the target data, wherein the third node is located in a second region different from the first region;
wherein the data identifier comprises a first portion that is determined as a function of the target data and a second portion that is indicative of a geographic location of the target data, the second portion being configured for decoupling from the first portion so as to permit replacement in at least one of the nodes of a first instance of the second portion indicating location of the target data in one of the first and second regions with a second instance of the second portion, different than the first instance of the second portion, indicating location of the target data in another one of the first and second regions, without changing the first portion that is determined as the function of the target data; and
wherein a given one of the nodes within a given one of the regions generates a geographic location identifier for that given node, and responsive to receiving a data block in the given node, the given node generates a first portion of a data identifier for the data block at least in part as a hash identifier for the data block, determines whether or not the geographic location identifier generated for the given node is decoupled from the hash identifier for the data block, and responsive to determining that the geographic location identifier generated for the given node is decoupled from the hash identifier for the data block, stores the data block within the given node, and couples the geographic location identifier generated for the given node to the hash identifier for the data block.

13. The electronic device according to claim 12, wherein the data identifier comprises a hash identifier and a first geographic information identifier representing the first region, and the first geographic information identifier and the hash identifier are configured for decoupling from one another.

14. The electronic device according to claim 13, wherein the metadata is obtained based on update of initial metadata, the initial metadata is stored at a fourth node in the second region, an initial data identifier in the initial metadata comprises the hash identifier and a second geographic information identifier representing the second region, and the second geographic information identifier and the hash identifier are configured for decoupling from one another.

15. The electronic device according to claim 14, wherein the actions further comprise:
acquiring the initial metadata from the fourth node;
generating the first geographic information identifier in response to determining that the target data is to be searched for by a node in the first region;
decoupling the second geographic information identifier from the hash identifier;
updating the decoupled second geographic information identifier to the first geographic information identifier, and coupling the first geographic information identifier with the hash identifier to obtain the metadata comprising the data identifier; and
storing the metadata in the second node based on the data identifier.

16. The electronic device according to claim 15, wherein storing the metadata in the second node based on the data identifier comprises:
determining a distance between the data identifier and an identifier of each node in the first region;
determining the shortest distance in the distances; and
determining a node corresponding to the shortest distance in the first region as the second node.

17. The electronic device according to claim 14, wherein the metadata is generated by the fourth node and sent by the fourth node to the second node in the first region.

18. The electronic device according to claim 17, wherein the metadata is generated by the fourth node by the following operations:
generating, in response to determining that the first region is a target region for searching for the target data, the first geographic information identifier representing the first region;
generating the data identifier based on the hash identifier and the first geographic information identifier; and
generating the metadata based on the data identifier.

19. The electronic device according to claim 13, wherein the actions further comprise:
decoupling a first geographic location identifier in the data identifier from the hash identifier; and
processing the searching request in response to the decoupling to acquire the target data.

20. The electronic device according to claim 13, wherein the actions further comprise:

generating a first geographic location identifier based on node configuration information;

receiving a data block, and generating a corresponding hash identifier of the data block based on the received data block;

processing and storing the data block in a case where the first geographic location identifier is decoupled from the corresponding hash identifier; and coupling the first geographic location identifier with the corresponding hash identifier to generate a corresponding data identifier of the data block, and storing the corresponding data identifier in a routing lookup table.

21. A computer program product tangibly stored on a non-transitory computer-readable medium and comprising machine-executable instructions, wherein the machine-executable instructions, when executed by a machine, cause the machine to perform a method for cross-regional data searching, the method comprising:

acquiring a data identifier of target data in response to receiving a searching request for the target data at a first node;

determining, based on the data identifier, a second node storing metadata of the target data, wherein both the first node and the second node are located in a first region, and the metadata comprises the data identifier; and determining, based on the metadata, a third node storing the target data, wherein the third node is located in a second region different from the first region;

wherein the data identifier comprises a first portion that is determined as a function of the target data and a second portion that is indicative of a geographic location of the target data, the second portion being configured for decoupling from the first portion so as to permit replacement in at least one of the nodes of a first instance of the second portion indicating location of the target data in one of the first and second regions with a second instance of the second portion, different than the first instance of the second portion, indicating location of the target data in another one of the first and second regions, without changing the first portion that is determined as the function of the target data; and wherein a given one of the nodes within a given one of the regions generates a geographic location identifier for that given node, and responsive to receiving a data block in the given node, the given node generates a first portion of a data identifier for the data block at least in part as a hash identifier for the data block, determines whether or not the geographic location identifier generated for the given node is decoupled from the hash identifier for the data block, and responsive to determining that the geographic location identifier generated for the given node is decoupled from the hash identifier for the data block, stores the data block within the given node, and couples the geographic location identifier generated for the given node to the hash identifier for the data block.

* * * * *